Patented Feb. 17, 1948

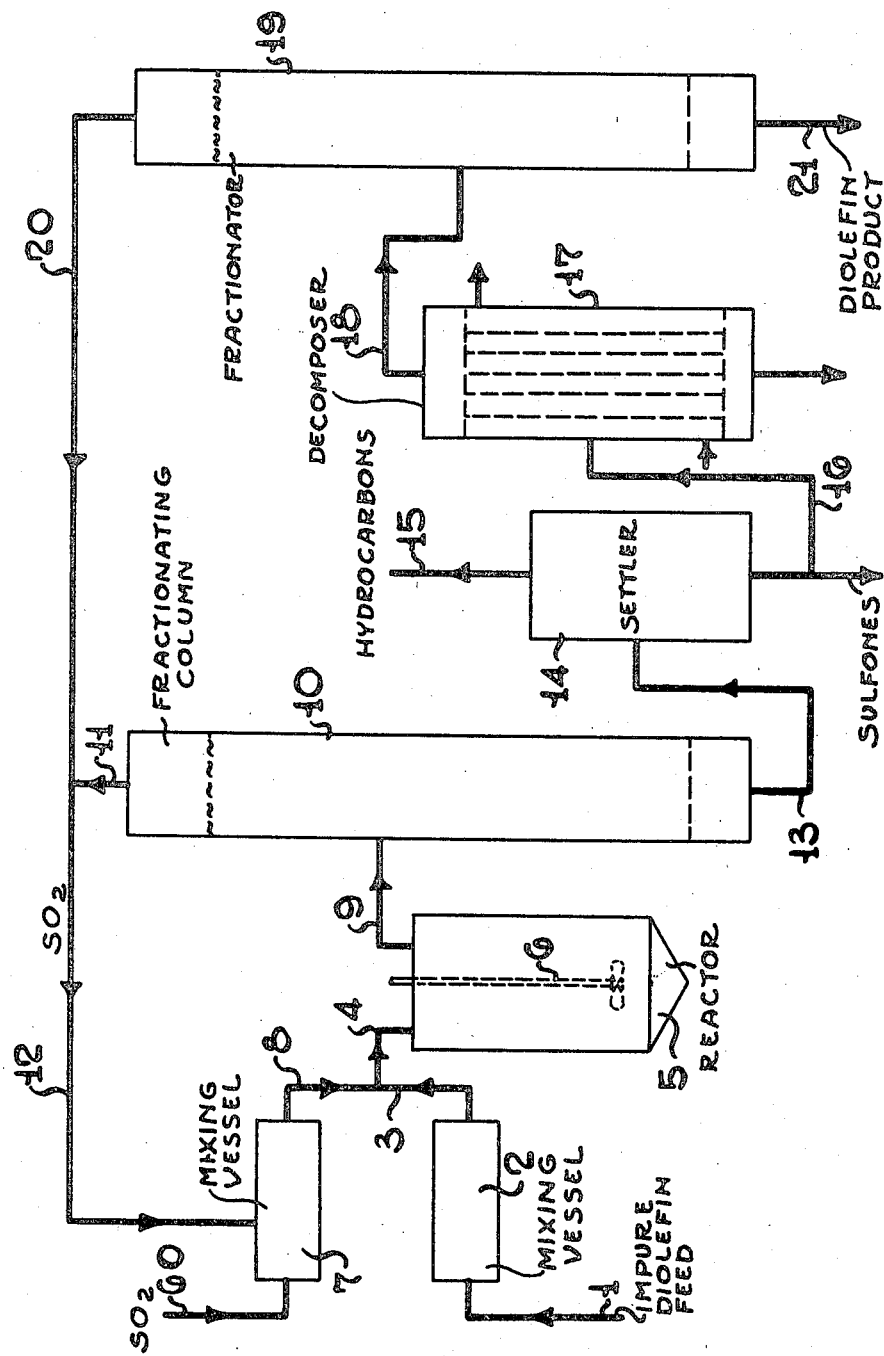

2,436,149

UNITED STATES PATENT OFFICE 2,436,149

EXTRACTION OF A DIOLEFIN

Nicholas Menshih, Summit, N. J., assignor to Standard Oil Development Company, a corporation of Delaware Application December 29, 1945, Serial No. 638,420

6 Claims. (Cl. 260—681.5)

This invention relates to separation and concentration of a diolefin, and more particularly to the separating of a pure diolefin from a mixture of saturated and unsaturated hydrocarbons having the same boiling range.

According to this invention, it has been found that sulfur dioxide may be used to effectively separate the diolefin from the said mixture of saturated hydrocarbon containing diolefin and the various impurities as enumerated.

The mixture of saturated and unsaturated hydrocarbon particularly, petroleum refinery raw materials having from 4 to 6 carbon atoms to the molecule and containing a diolefin such as butadiene, 2,3-dimethyl butadiene, isoprene and/or the piperylenes, likewise, may also contain all or some of the following impurities: acetylenes, oxygenated compounds, such as, aldehydes, acids, ketones, peroxides, sulfur-containing compounds, nitrogen-containing compounds and halide-containing compounds, together with paraffin hydrocarbons, olefins, other unsaturated hydrocarbons, aromatic hydrocarbons and/or naphthenic compounds. These impurities may be removed by liquid-liquid extraction or vapor liquid extraction, using various solvents or the diolefin removed directly from the mixture. Various methods have been used, but the recovery of substantially pure diolefin was obtained only after using a complicated process, using a plurality of extraction and distilling towers.

Sulfur dioxide was found to form addition products with conjugated diolefinic hydrocarbons, which products were known as monosulfones. The discovery was made late in the last century but it has been only of academic interest until recent years. Many of the monomeric diolefin sulfones are well-defined crystalline substances, which melt at relatively low temperatures, and decompose under atmospheric pressure at temperatures somewhat above 100° C. to give the original components. For example, isoprene and dimethyl butadiene form monosulfones melting at 63.5° and 135° C. respectively, and the former decomposes in the range of temperature 120°–135° C. under normal pressures.

This sulfone process of concentrating dienes should not be confused with the $SO_2$ extraction processes for purifying petroleum distillates. In purifying petroleum distillates liquid sulfur dioxide is used only as a selective physical solvent and there is no sulfone formation there as disclosed in U. S. Pat. 911,553, as issued February 2, 1909, to Edeleanu. A German Pat. 236,386 was issued July 4, 1911, to A. Badische showing the use of sulfur dioxide for concentrating a diolefin by the use of sulfur dioxide to form sulfones and disclosed examples of reaction with 2,3-dimethylbutadiene and isoprene. A U. S. Pat. 1,196,259 as issued August 29, 1916, to Matthews and Strange disclosed a process in which the reaction was carried out in the presence of a halogen-containing body, such as HCl, iodine, acid chlorides, sulfur chloride, etc., to promote the formation of a "crystallizable sulfoxide" instead of the amorphous form. A U. S. Pat. 1,436,289, issued November 21, 1922, to Plauson who disclosed the use of acetone solutions of $SO_2$ for the reaction, while Van Wijk in U. S. Pat. 2,205,996, issued June 25, 1940, disclosed the use of mixtures of furfural, methyl formate, alcohol, etc., and $SO_2$ in preparing the solutions of sulfur dioxide used in the reaction. Staudinger, according to British Pat. 361,341 that was issued in 1930 was the first to develop a sulfone process involving the use of a stabilizing agent or anti-catalyst, which was claimed to obviate the formation of polymerized sulfones. Such stabilizers may consist of polyhydric or other phenols (e. g., hydroquinone, catechol, and pyrogallol), amines, and metallic copper or its salt. Perkins in his U. S. Pat. 1,993,681 that was issued March 5, 1935, disclosed that the formation of the amorphous polysulfone product can be substantially avoided without the use of a restraining agent without a large excess of sulfur dioxide by causing the hydrocarbon to be contacted with small amounts (less than one-half its weight) of sulfur dioxide in a series of step-wise reactions. In all of these disclosures use of complicated apparatus was necessary, especially where a small amount of sulfur dioxide was used as only a small fraction of the diolefin reacted.

The object of this invention is to provide a process in which the diolefin may be readily separated from the various impurities and diluents and concentrated in at least a 90 per cent concentration. The quantity of sulfur dioxide added to the mixture of saturated and unsaturated hydrocarbon containing the diolefin is about 3.5 mols for each mol of the diolefin. By using this amount of sulfur dioxide, the reaction products are found to separate into two layers. One layer is found to contain the major fraction of the sulfone that is formed, the other, or lighter layer, contains a very small amount of the sulfone which may be recycled and recovered. The fraction containing the major portion of the sulfone may then be heated to drive off any unreacted hydrocarbons and sulfur dioxide and heated further to decompose into the component parts of the diolefin and sulfur dioxide which are then readily separated.

If a higher concentration of the diolefin than 90 per cent is desired, the sulfone layer may be washed with a saturated liquid hydrocarbon having about 6 carbon atoms to the mol and then the remaining sulfone heated to yield its component parts of diolefin and sulfur dioxide. This invention will be more clearly understood by reading the following description with reference to the accompanying drawing:

A mixture of hydrocarbons having 5 carbon atoms to the molecule, obtained by cracking petroleum hydrocarbons, or from any other source, is passed through pipe 1 into mixing vessel 2 where an oxidation inhibitor, such as tertiary butyl catechol, is added, and then passed through pipe 3 into pipe 4 and into reactor 5. Other oxidation inhibitors may be used, such as cresols, alpha-naphthol, phenols, substituted phenols, hydroxy benzenes and hydroxy naphthalenes. The liquid sulfur dioxide is passed through pipe 60 to mixing vessel 7 where, likewise, the oxidation inhibitor, tertiary butyl catechol, is added and then passed through pipe 8 and pipe 4 to reactor 5. The quantity of sulfur dioxide added is about 3.5 mols for each mol of isoprene. A stirrer 6 is provided in the reactor to obtain intimate contact of the two solutions. The reaction products are maintained in reactor 5 for two hours at a temperature of 212° F. and then passed from reactor 5 by means of pipe 9 into fractionating column 10 where the excess of sulfur dioxide is removed by means of pipe 11, being returned through pipe 12 to mixing vessel 7. The bottoms, comprising C$_5$ olefins and sulfone, are passed through pipe 13 to settler 14 which is maintained at a temperature of approximately 160° F. and allowed to settle, where two liquid layers in equilibrium with each other are formed, having the following approximate compositions: 2 weight percent sulfone +98 weight percent C$_5$ olefins as the upper layer, and 5 weight percent C$_5$ olefins and 95 weight percent sulfone as the lower layer.

The upper layer is removed and, after caustic washing to free it of residual sulfone, is returned to storage by means of pipe 15. The lower layer is passed through pipe 16 to decomposer 17, where a temperature ranging from 248° to 275° F. is maintained. The resulting products are then passed into pipe 18 into fractionator 19, where a temperature of above 14° F. is maintained, sulfur dioxide being removed therefrom by means of pipe 20 and returned through pipe 12 to mixing vessel 7. Isoprene of at least 90% purity is removed through pipe 21, and if a purerer product of isoprene is desired, it may be scrubbed with liquid C$_6$ hydrocarbons to free it of impurities and redistilled.

I claim:
1. The process of separating and concentrating a diolefin from a mixture of hydrocarbons containing a diolefin which comprises contacting a mixture of hydrocarbons containing the diolefin with an excess of sulfur dioxide to form a sulfone, heating the mixture of sulphur dioxide, hydrocarbons and sulfone to drive off the excess of sulfur dioxide, removing the residual mixture of sulfone and hydrocarbons to a settling zone and allowing said last mentioned mixture to settle and form two liquid layers at a lower temperature, separating the lower layer, heating the said separated lower layer to a decomposing temperature, and separately recovering sulfur dioxide and the diolefin.

2. The process of separating and concentrating a diolefin from a mixture of hydrocarbons containing a diolefin which comprises contacting a mixture of hydrocarbons containing a diolefin with 3.5 mols of sulfur dioxide for each mol of the diolefin at a temperature of about 212° F. for a period of about 2 hours, removing the excess of sulfur dioxide from the mixture, removing the mixture, substantially free of the sulfur dioxide, to a settling zone and allowing said last mentioned mixture to settle and form two liquid layers, separating the lower layer, which contains substantially all of the sulfone, heating the said separated lower layer to a decomposing temperature, and separately recovering sulfur dioxide and the diolefin.

3. The process of separating and concentrating a diolefin according to claim 2 in which an oxidation inhibitor is added to the diolefin and sulfur dioxide.

4. The process of separating and concentrating isoprene from a mixture of hydrocarbons containing isoprene which comprises contacting a mixture of hydrocarbons containing isoprene and an oxidation inhibitor with 3.5 mols of sulfur dioxide for each mol of isoprene to form a sulfone, removing the excess sulfur dioxide, removing the mixture, free of excess sulfur dioxide, to a settling zone and allowing it to settle and form two liquid layers, at a lower temperature, separating the lower layer, heating the said separated lower layer to a temperature of at least 248° F., and separately recovering sulfur dioxide and isoprene.

5. The process of separating and concentrating isoprene from a mixture of hydrocarbons which comprises contacting a mixture of hydrocarbons containing isoprene and an oxidation inhibitor with 3.5 mols of sulfur dioxide for each mol of isoprene for about 2 hours at a temperature of about 212° F., stripping the resulting mixture of sulfur dioxide, hydrocarbons and sulfone to remove the excess of sulfur dioxide, removing the mixture of sulfone and hydrocarbons to a settling zone and allowing said mixture to settle and form two liquid layers, separating the lower layer, heating the said separated lower layer to a temperature ranging from 248° F. to 275° F., and separately recovering sulfur dioxide and isoprene.

6. The process of separating and concentrating isoprene according to claim 5 in which the settling temperature is maintained at about 160° F.

NICHOLAS MENSHIH.

REFERENCES CITED

The following references are of record in the file of this patent:

UNITED STATES PATENTS

| Number | Name | Date |
|---|---|---|
| 2,271,092 | Perkins et al. | Jan. 27, 1942 |
| 2,375,023 | Morris et al. | May 1, 1945 |
| 2,380,831 | Frey | July 31, 1945 |
| 2,381,409 | Stowe | Aug. 7, 1945 |
| 2,403,054 | Craig | July 2, 1946 |